United States Patent
Gareau

(10) Patent No.: US 11,974,079 B2
(45) Date of Patent: *Apr. 30, 2024

(54) SUBRATING AND MULTIPLEXING NON-STANDARD RATES IN ZR AND ZR+ OPTICAL INTERFACES

(71) Applicant: Ciena Corporation, Hanover, MD (US)

(72) Inventor: Sebastien Gareau, Ottawa (CA)

(73) Assignee: Ciena Corporation, Hanover, MD (US)

( * ) Notice: Subject to any disclaimer, the term of this patent is extended or adjusted under 35 U.S.C. 154(b) by 160 days.

This patent is subject to a terminal disclaimer.

(21) Appl. No.: 17/630,735

(22) PCT Filed: Jul. 20, 2020

(86) PCT No.: PCT/US2020/042714
§ 371 (c)(1),
(2) Date: Jan. 27, 2022

(87) PCT Pub. No.: WO2021/021474
PCT Pub. Date: Feb. 4, 2021

(65) Prior Publication Data
US 2022/0264204 A1    Aug. 18, 2022

Related U.S. Application Data

(63) Continuation of application No. 16/524,389, filed on Jul. 29, 2019, now Pat. No. 10,750,260.

(51) Int. Cl.
*H04Q 11/00* (2006.01)
*H04J 14/02* (2006.01)

(52) U.S. Cl.
CPC ...... *H04Q 11/0071* (2013.01); *H04J 14/0261* (2013.01); *H04Q 11/0066* (2013.01); *H04Q 2011/0086* (2013.01)

(58) Field of Classification Search
None
See application file for complete search history.

(56) References Cited

U.S. PATENT DOCUMENTS 7,742,502 B2 * 6/2010 Vissers ................ H04J 3/1658
370/476
8,867,913 B2   10/2014 Gareau et al.
(Continued)

OTHER PUBLICATIONS

Microsemi, The Evolution of ITU-T G.709 Optical Transport Network (OTN) Beyond 100Gbit/s (Year: 2017).*
(Continued)

*Primary Examiner* — Jai M Lee
(74) *Attorney, Agent, or Firm* — Baratta Law PLLC; Lawrence A. Baratta, Jr.

(57) ABSTRACT

A ZR or ZR+ interface includes circuitry configured to receive one or more client signals; and circuitry configured to transmit the one or more client signals as an aggregate signal in a Flexible Ethernet (FlexE) format in one of a ZR format and a ZR+ format, including a mapping indicative of how the one or more client signals are one of multiplexed and subrated into the aggregate signal. The aggregate signal can have a rate that does not correspond to a standard Ethernet Physical Medium Dependent (PMD). The FlexE format can include a plurality of FlexE instances with at least one of the FlexE instances having calendar slots removed for a subrating application.

20 Claims, 8 Drawing Sheets

(56) References Cited

U.S. PATENT DOCUMENTS

| | | | |
|---|---|---|---|
| 9,071,364 B1* | 6/2015 | Voois | H04B 10/58 |
| 9,209,926 B2* | 12/2015 | Mutoh | H04J 3/1652 |
| 9,705,627 B2* | 7/2017 | Abbas | H04J 14/0257 |
| 9,800,361 B2 | 10/2017 | Gareau et al. | |
| 9,838,290 B2 | 12/2017 | Gareau | |
| 10,090,960 B2* | 10/2018 | Cao | H04L 12/4633 |
| 10,097,480 B2* | 10/2018 | Gareau | H04J 3/065 |
| 10,116,403 B2* | 10/2018 | Gareau | H04J 3/1664 |
| 10,135,760 B2 | 11/2018 | Gareau | |
| 10,193,688 B2 | 1/2019 | Gareau et al. | |
| 10,218,823 B2 | 2/2019 | Gareau | |
| 10,225,037 B2 | 3/2019 | Gareau | |
| 10,256,909 B2 | 4/2019 | Gareau et al. | |
| 10,313,103 B1* | 6/2019 | Perras | H04B 10/516 |
| 10,659,854 B1* | 5/2020 | Alfiad | H04Q 11/0005 |
| 10,750,260 B1* | 8/2020 | Gareau | H04Q 11/0066 |
| 10,771,180 B1* | 9/2020 | Schmogrow | H04J 14/0206 |
| 10,880,010 B2* | 12/2020 | Voois | H04B 10/58 |
| 11,082,146 B2* | 8/2021 | Bleck | H04J 3/1652 |
| 11,374,673 B2* | 6/2022 | Hu | H04B 10/291 |
| 11,469,844 B2* | 10/2022 | Du | H04J 3/1658 |
| 11,664,890 B2* | 5/2023 | Li | H04B 10/25 398/7 |
| 2006/0187715 A1 | 8/2006 | Narvaez et al. | |
| 2009/0077395 A1 | 3/2009 | Tsai | |
| 2012/0219005 A1 | 8/2012 | Durve et al. | |
| 2015/0085830 A1 | 3/2015 | Nozaki et al. | |
| 2015/0214468 A1 | 7/2015 | Matsuda | |
| 2015/0295840 A1* | 10/2015 | Loehr | H04L 47/365 398/68 |
| 2016/0119075 A1* | 4/2016 | Gareau | H04J 14/0227 398/58 |
| 2018/0013511 A1* | 1/2018 | Hussain | G02B 6/12033 |
| 2018/0167160 A1 | 6/2018 | Gareau et al. | |
| 2019/0068322 A1 | 2/2019 | Smith et al. | |
| 2019/0173856 A1 | 6/2019 | Gareau et al. | |
| 2019/0385057 A1 | 12/2019 | Litichever et al. | |

OTHER PUBLICATIONS

OIF, Flex Ethernet Implementation Agreement, IA # OIF-FLEXE-01.1, Jun. 21, 2017.
OIF, Flex Ethernet Implementation Agreement, IA # OIF-FLEXE-02.0, Jun. 22, 2018.
Lyubomirsky et al., Baseline Proposal for 400G/80km, IEEE P802.3cn Task Force Meeting, Nov. 12-13, 2018 13, 2018.
Lyubomirsky et al., 400G FEC and Framing for 80km, Sep. 10, 2018.
Bechtolsheim, Arista Networks, Inc., "400G and 800G Ethernet and Optics," Feb. 27, 2019, pp. 1-40.
OIF, Implementation Agreement 400ZR, IA# OIF-400ZR 0.12-Draft, Jun. 24, 2019, pp. 1-93.
CAIA, "G.mtn Section Layer considerations and information structure elements," China Information Communication Technologies Group, WD11-15, Apr. 8-12, 2019, pp. 1-8.
Oct. 14, 2020, International Search Report and Written Opinion for International Patent Application No. PCT/US2020/042714.

* cited by examiner

FIG. 8

| Rate | O-code Value | Number of P | Standard PMD | Config |
|---|---|---|---|---|
| 400ZR | 0xFFFFFF<br>0xFFFFFF<br>0xFFFFFF<br>0xFFFFFF | 4 | 400GBASE-R | 100<br>100<br>100<br>100 |
| 350ZR | 0xFFFFFF<br>0xFFFFFF<br>0x07FFFF<br>0x07FFFF | 4 | No | 100<br>100<br>75<br>75 |
| 300ZR | 0xFFFFFF<br>0xFFFFFF<br>0xFFFFFF | 3 | No | 100<br>100<br>100 |
| 250ZR | 0xFFFFFF<br>0x003FF<br>0x003FF<br>0x003FF | 4 | No | 100<br>50<br>50<br>50 |
| 200ZR | 0xFFFFFF<br>0xFFFFFF | 2 | 200GBASE-R | 100<br>100 |
| 200ZR | 0xFFFFFF<br>0x003FF<br>0x003FF | 3 | No | 100<br>50<br>50 |
| 150ZR | 0xFFFFFF<br>0x003FF | 2 | No | 100<br>50 |

| SH | 0 1 | 2 3 4 5 6 7 | 8 9 10 11 | 12 13 14 15 16 17 18 19 20 21 22 23 24 25 26 27 28 29 30 31 | 32 33 34 35 | 36 37 38 39 40 41 42 43 44 45 46 47 48 49 50 51 52 53 54 55 56 57 58 59 60 61 62 63 |
|---|---|---|---|---|---|---|
| 1 0 | | 0x48 | 0x0 | 0xF_FFFF | 0x5 | 0x0000_0000 |

SUBRATING AND MULTIPLEXING NON-STANDARD RATES IN ZR AND ZR+ OPTICAL INTERFACES

FIELD OF THE DISCLOSURE

The present disclosure generally relates to networking. More particularly, the present disclosure relates to systems and methods for subrating and multiplexing non-standard rates in ZR and ZR+ optical interfaces.

BACKGROUND OF THE DISCLOSURE

400ZR is an implementation agreement from the Optical Internetworking Forum (OIF) for high bandwidth data center interconnects via optical modules. This implementation agreement specifies an interoperable digital coherent 400ZR interface targeted at short-reach (80 km or more) Dense Wavelength Division Multiplexing (DWDM) amplified noise limited links and unamplified loss limited links. 400ZR specifies framing techniques and will be embodied in pluggable optical modules such as an Octal Small Form-factor Pluggable (OSFP) or Double Density Quad Small Form-factor Pluggable (QSFP-DD). Effectively, 400ZR provides a new type of Ethernet PHY based on optical coherent technology. 400ZR reduces cost and complexity for high bandwidth data center interconnects using higher-order modulation and DWDM while ensuring coordination at both ends eliminating proprietary vendor solutions. Pluggable coherent 400ZR solutions support 400G Ethernet client only and multi-vendor interoperability. With industry-wide collaboration on 400ZR, the derivative term 'ZR+' is being used as a catch-all reference covering the expanded use of footprint-optimized, longer-reach, multi-rate (>200G) pluggable solutions in next-generation data center interconnects and metro networks.

It is expected ZR and ZR+ will be widely deployed in data center interconnects and metro networks. However, the current scope of such work focuses on single client transport. There is a large amount of 100 Gigabit Ethernet (GbE) services deployed, and the transition to 400ZR native rates (400 GbE) will be gradual. There is a need to provide a technique for multiplexing non-standard rates or subrating with ZR and ZR+, for example, support of 3×300 GbE into one coherent 300ZR+ interface.

BRIEF SUMMARY OF THE DISCLOSURE

In an embodiment, a ZR or ZR+ interface includes circuitry configured to receive one or more client signals; and circuitry configured to transmit the one or more client signals as an aggregate signal in a Flexible Ethernet (FlexE) format in one of a ZR format and a ZR+ format, including a mapping indicative of how the one or more client signals are one of multiplexed and subrated into the aggregate signal. The aggregate signal can have a rate that does not correspond to a standard Ethernet Physical Medium Dependent (PMD). The FlexE format can include a plurality of FlexE instances with at least one of the FlexE instances having calendar slots removed. The mapping can be located in one or more PAD blocks associated with the FlexE format. The one or more client signals can be mapped to the FlexE format utilizing an asynchronous mapping, and the FlexE format can be mapped to one of the ZR format and the ZR+ format utilizing a Bit synchronous Generic Mapping Protocol (BGMP). The circuitry configured to receive the one or more client signals can be connected to a router and the router provides the one or more client signals at rates less than the ZR format and the ZR+ format. The ZR or ZR+ interface can further include an optical interface configured to transmit the aggregate signal in one of the ZR format and the ZR+ format.

In another embodiment, a transport device includes one or more ZR or ZR+ interfaces each including circuitry configured to receive one or more client signals; and circuitry configured to transmit the one or more client signals as an aggregate signal in a Flexible Ethernet (FlexE) format in one of a ZR format and a ZR+ format, including a mapping indicative of how the one or more client signals are one of multiplexed and subrated into the aggregate signal. The aggregate signal can have a rate that does not correspond to a standard Ethernet Physical Medium Dependent (PMD). The FlexE format can include a plurality of FlexE instances with at least one of the FlexE instances having calendar slots removed. The mapping can be located in one or more PAD blocks associated with the FlexE format. The one or more client signals can be mapped to the FlexE format utilizing an asynchronous mapping, and the FlexE format can be mapped to one of the ZR format and the ZR+ format utilizing a Bit synchronous Generic Mapping Protocol (BGMP). The circuitry configured to receive the one or more client signals can be connected to a router and the router provides the one or more client signals at rates less than the ZR format and the ZR+ format. Each of the one or more ZR or ZR+ interfaces can each further include an optical interface configured to transmit the aggregate signal in one of the ZR format and the ZR+ format.

In a further embodiment, a method includes receiving one or more client signals; and transmitting the one or more client signals as an aggregate signal in a Flexible Ethernet (FlexE) format in one of a ZR format and a ZR+ format, including a mapping indicative of how the one or more client signals are one of multiplexed and subrated into the aggregate signal. The aggregate signal can have a rate that does not correspond to a standard Ethernet Physical Medium Dependent (PMD). The FlexE format can include a plurality of FlexE instances with at least one of the FlexE instances having calendar slots removed. The mapping can be located in one or more PAD blocks associated with the FlexE format. The one or more client signals can be mapped to the FlexE format utilizing an asynchronous mapping, and the FlexE format can be mapped to one of the ZR format and the ZR+ format utilizing a Bit synchronous Generic Mapping Protocol (BGMP). The receiving can be from a router that provides the one or more client signals at rates less than the ZR format and the ZR+ format.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1A is a network diagram of a 400ZR application for data center interconnect. FIG. 1B is a network diagram of a multi-span metro transport application utilizing ZR+ at multi-rate. FIG. 1C is a network diagram of a multi-span metro packet-optical application utilizing ZR+ at multi-rate.

FIG. 8 is a diagram the format of the P1 PAD block and a table 60 of example crunch values.

DETAILED DESCRIPTION OF THE DISCLOSURE

Figure 1A:
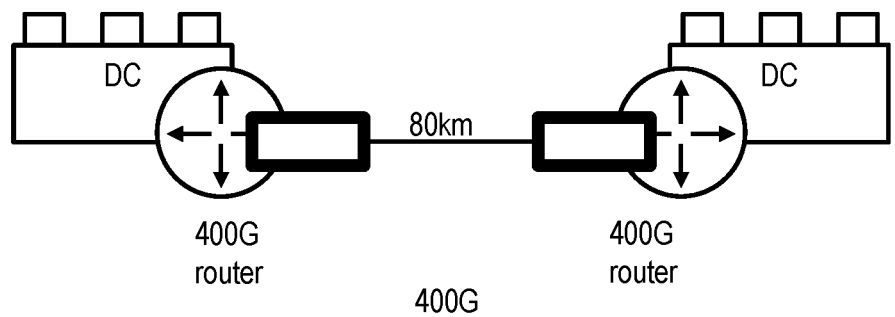
FIGS. 1A-1C are network diagrams of example 400ZR and ZR+ applications. Specifically.

The present disclosure relates to systems and methods for subrating and multiplexing in ZR and ZR+ optical interfaces. Specifically, the present disclosure contemplates using Flexible Ethernet (FlexE) or Metro Transport Networking (MTN) techniques with ZR or ZR+ to support multiplexing signals, including subrate signals into a ZR or ZR+ coherent line. As described herein, multiplexing involves signal mapping to non-standard PMDs, i.e., 3 to 1 mapping, or 30×10 GbE clients into one 300ZR, i.e., a 30 to 1 mapping. Subrating includes a crunching function where the client signals are at odd rates, not currently covered by current IEEE 802.3 standardized rates, e.g., a partially filled 400 GbE at 350 GbE to support a 350ZR, 25×10 GbE to support a 250ZR, 50× FlexE calendar slots to support a 250ZR, etc. FlexE currently only supports Ethernet clients, but if multi-service would be supported, other client types could also be multiplexed.

Advantageously, the present disclosure provides an approach to extend ZR and ZR+ interfaces to support legacy interfaces via multiplexing. Data center and metro network operators see the value in ZR and ZR+ interfaces at the optical layer. This approach extends the value of such interfaces to support non-native signals with ZR or ZR+.

ZR/ZR+ Overview

As described herein, the terms ZR and ZR+ are used together to refer to a digital coherent Ethernet interface, and this also includes an Ethernet extension scheme. That is, ZR and ZR+ may be physically implemented as coherent optical modules, and this also includes an Ethernet Physical Coding Sublayer (PCS) extension scheme where new AMs (alignment markers) are used on the coherent line, and a new FEC added to the Ethernet structure. ZR and ZR+ may refer to the optical modules, to circuitry configured to perform the Ethernet extension, and/or to a process by which Ethernet (or other clients) is extended. Of note, the present disclosure is described with reference to ZR and ZR+, but those of ordinary skill in the art will recognize other Ethernet extension techniques are also contemplated including ZR++ and IEEE 802.2ct which will define Ethernet PHYs for 100 Gb/s and 400 Gb/s over DWDM systems.

Networks continue to evolve, necessitating new and innovative solutions to meet the requirements of network operators to maximize fiber utilization (bandwidth), and reduce the cost of data transport (cost). Coherent optical transmission has been a key enabling technology supporting both requirements of bandwidth and cost. Depending on the requirements of different parts of the network, two primary types of coherent solutions are emerging. One supports performance-optimized systems, which maximize fiber capacity and programmability. The other supports footprint-optimized systems, where performance trade-offs are made to support low power and small space requirements for high-density modular systems.

For some data center operators, single-span connectivity at 400 Gb/s capacity between data centers is an example where footprint-optimized, coherent solutions—having tailor-made capabilities for reach, network compatibility, and spectral efficiency—are ideal. These relatively high-capacity, modular 400ZR solutions will be based on coherent technology primarily targeted to QSFP-DD and OSFP form factors, but could also be implemented in any form factor. 400ZR operates at 60 Gbaud and 16 Quadrature Amplitude Modulation (QAM) with dual-polarization. Advantageously, 400ZR support 400 GbE in 75 GHz of spectrum and is slightly less than the corresponding optical formats (e.g., FlexO) which would not support the 75 GHz spectrum. Thus, ZR and ZR+ provide efficiencies for optical transmission.

ZR+ is a general reference to a potential range of solutions, or operating modes, for coherent pluggable solutions, beyond the specifications of 400ZR (e.g., 400G, 80 km, etc.). That is, ZR+ collectively refers to other modes that may be supported by coherent optical modules in addition to ZR. One definition of ZR+ is a straightforward extension of 400ZR transcoded mappings of Ethernet with a higher performance Forward Error Correction (FEC) to support longer reaches. In this interpretation, ZR+ modules would be narrowly defined as supporting a single-carrier 400 Gb/s optical line rate and transporting 400 GbE client signals at metro reaches (up to around 500 km).

Another definition of ZR+ is a pluggable coherent module, or set of module products, that supports a range of different line rates, client types and reaches, and which are compatible with metro photonic line systems. This could include modules supporting 200 to 400 Gb/s capacity at metro reaches or even metro/regional reaches, as well as support for Optical Transport Network (OTN) in addition to Ethernet. For extended reaches, in addition to higher performance FEC, these modules can require tunable optical filters and amplifiers. Compared to the performance of a 400ZR pluggable module, or an extended reach ZR+ version of 400ZR, these solutions are sometimes referred to as 'ZR++' to indicate the greatly extended capabilities for transporting up to 400 Gb/s line rates.

Figure 1B:
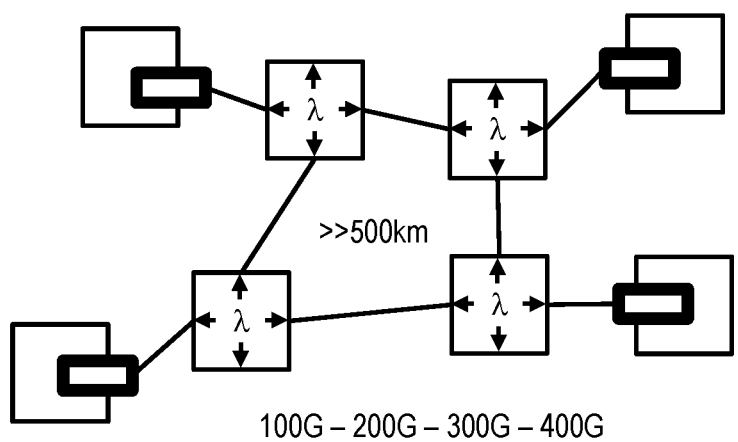
Figure 1C:
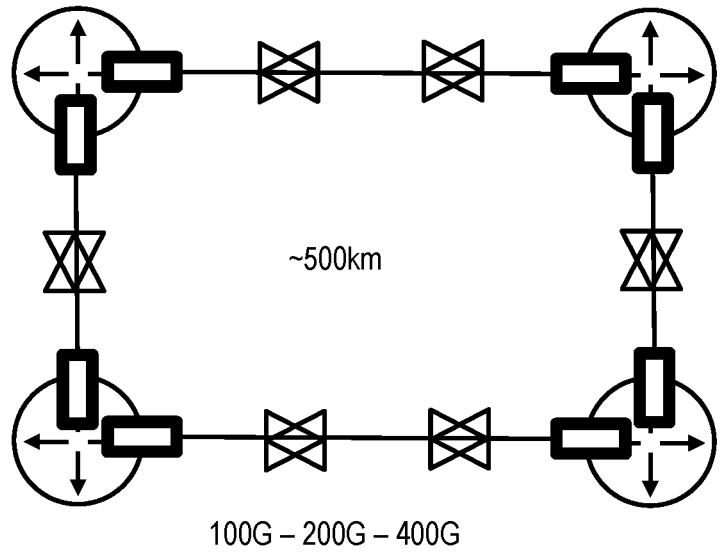

FIGS. 1A-1C are network diagrams of example 400ZR and ZR+ applications.

Specifically, FIG. 1A is a network diagram of a 400ZR application for data center interconnect. FIG. 1B is a network diagram of a multi-span metro transport application utilizing ZR+ at multi-rate. FIG. 1C is a network diagram of a multi-span metro packet-optical application utilizing ZR+ at multi-rate. Thus, ZR+ provides an extension of the 400ZR from single span to multiple spans, longer distances, different rates, etc. It is expected that ZR+ will be deployed across a range of products, including switches, routers, and optical transport equipment.

For example, ZR+ will have different modes, formats, baud rates, and distances. For example, the modes may include 100G, 200G, 300G, 400G, etc. The formats may include Quadrature Phase Shift Keying (QPSK), 8-QAM, 16-QAM, etc. The baud rate may include 32 Gbaud, 60 Gbaud, 64 Gbaud, etc. The distances may include 300 km, 500 km, 1000 km, 2000 km, 3000 km, etc. For example, a 100G ZR+ can include QPSK at 32 Gbaud for 3000 km, a 200G ZR+ can include QPSK at 64 Gbaud for 2000 km, a 200G ZR+ can include 16-QAM at 32 Gbaud for 500 km, a 300G ZR+ can include 8-QAM at 64 Gbaud for 1000 km, and a 400G ZR+ can include 16-QAM for 60 Gbaud for 300 km. Of course, other embodiments are also contemplated.

ZR/ZR+ Multiplexing Applications

Figure 2:
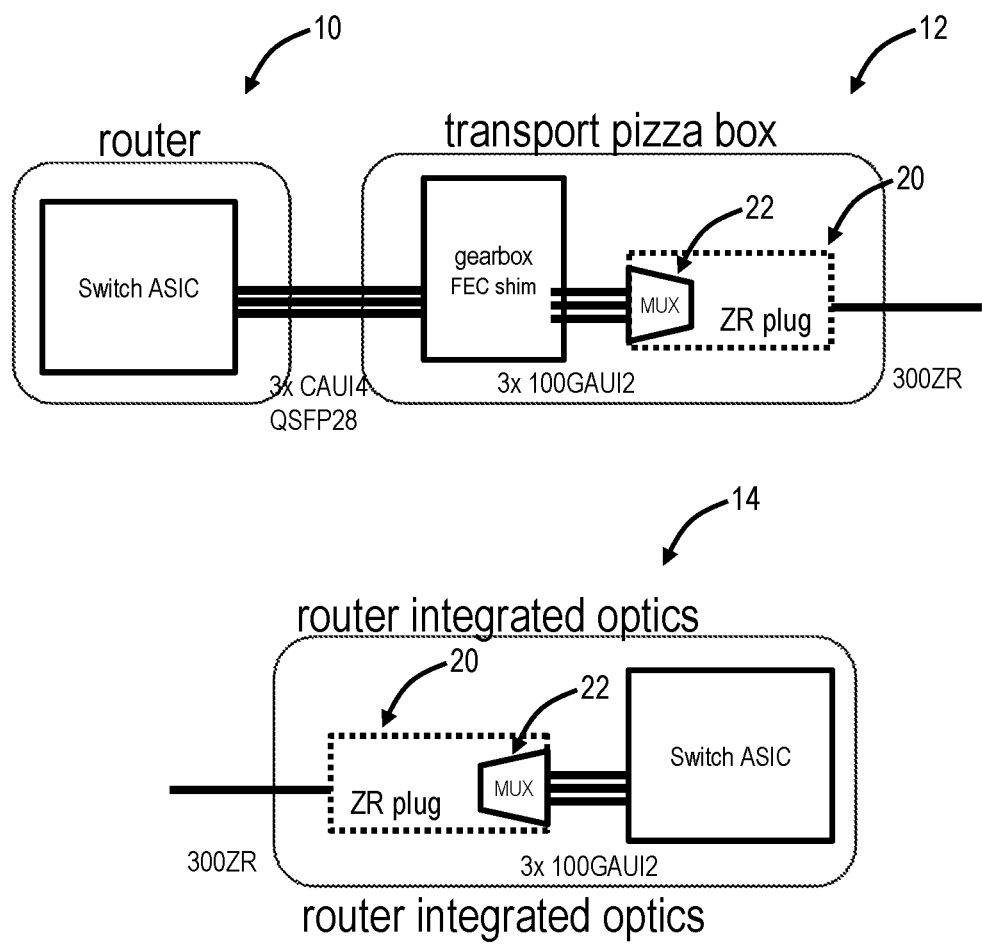
FIG. 2 is a diagram of various examples of ZR multiplexing at non-standard rates including between a router and a transport device, and with a router having integrated optics.

FIG. 2 is a diagram of various examples of ZR multiplexing of non-standard rates including between a router 10 and a transport device 12, and with a router 14 having integrated optics. For the router 10 and the transport device 12, the transport device 12 can be a "pizza box" or any other type of external DWDM network element. Here, the router 10 includes switching circuitry (e.g., an Application Specific Integrated Circuit (ASIC) interconnected to the transport device 12 such as via a 3×CAUI interface, e.g., QSFP28 providing 3×100 GbE. The transport device 12 includes a gearbox and a ZR interface 20. Multiplexing circuitry 22 can be in the gearbox or the ZR pluggable interface 20 to support 3×100 GbE to 300ZR mapping. For the router 14 having integrated optics, the ZR interface 20 can be integrated in the router 14. The multiplexing circuitry 22 can be in the ZR pluggable interface 20, a switching circuitry, or in a gearbox.

For ZR, the transition to 400 GbE clients/services likely will be gradual for some network operators, enabled by latest switch silicon products, and the economics of new interfaces (400 GbE over DD-QSFP) will improve over time and volume. Thus, 100 GbE services and QSFP28 will continue to be supported. The question is how to leverage power, cost, and footprint benefits of 400ZR for lower-rate services such as 10GE or 100GE.

There is a requirement for multiplexing with ZR and with ZR+. This multiplexing can include Ethernet clients but does not necessarily need to be limited to 100 GbE. Further, there is likely a future a need to support higher bandwidths, e.g., 800ZR. Also, no timing transparency is required, any multiplexing technique should work with existing, and future Ethernet Physical Medium Dependents (PMDs), and should work with 400ZR (e.g., ~60 Gbaud).

In an embodiment, the present disclosure includes multiplexing non-standard Ethernet PMDs such as 3×100 GbE to 300ZR, 7×100 GbE to 700ZR, 30×10 GbE to 300ZR, and the like, as illustrated in FIG. 2. Specifically, FIG. 2 includes examples of non-standard multiplexing to a 300ZR. Of course, other non-standard multiplexing rates are contemplated. That is, the present disclosure contemplates multiplexing to any non-standard Ethernet PMD rate.

FlexE/MTN

Flexible Ethernet (FlexE) is a link multiplexing technology initially specified in the Optical Internetworking Forum's Flexible Ethernet Implementation Agreement (document OIF-FLEXE-01.0, March 2016, OIF-FLEXE-01.1, June 2017, and OIF-FLEXE-02.0, June 2018, the contents of each is incorporated herein by reference). The Implementation Agreement (IA) enables one or more PHYs to be bonded, with clients of 10, 40, and m×25 Gb/s. The bonded 100GBASE-R PHYs are known as a FlexE Group. Also, MTN (metro transport networking) is being developed in the International Telecommunication Union (ITU) as G.mtn "Interfaces for a metro transport network." MTN has also been historically called "Flexible Ethernet (FlexE) switching" or "Sliced packet Networking (SPN)."

MTN can be used to accomplish a type of hard network slicing (a type of virtual private networking) for wireless and optical transport applications. MTN adds an Operations, Administration, and Maintenance (OAM) path function and switching function to the 64B/66B blocks of the FlexE client so that the stream of blocks can traverse FlexE links without having to be adapted back to MAC frames at every hop. FlexE technology is focused on providing big links between Ethernet switches so MAC frames from a FlexE client are re-constituted at every FlexE link hop and may subsequently be forwarded by IEEE802.1 bridging. MTN technology allows the 64B/66B blocks of the FlexE client stream to be switched at the egress of a FlexE link. MTN uses FlexE logic for the calendaring and multiplexing/demultiplexing functions over the Ethernet PHYs of OIF FlexE IA 2.0.

FlexE and MTN reuse many mechanisms from Ethernet. Much of the FlexE and MTN's functionality is achieved by adding a Time Division Multiplexing (TDM) calendar that interacts with the existing Ethernet 64B66B mechanisms, allowing bandwidth to be allocated with 5 Gb/s granularity, i.e., a Calendar Slot (CS). The calendar is communicated along with the data. For example, some details of FlexE are described in commonly-assigned U.S. Pat. No. 9,800,361, issued Oct. 24, 2017, and entitled "Flexible ethernet switching systems and methods," the contents of which are incorporated herein by reference.

FlexE provides a channelization use case which can address the multiplexing applications in ZR and ZR+. OIF-FLEXE-02.0 introduces 400 GbE PMD/PHY support and is compatible with 400ZR and IEEE 802.3ct PHYs. FlexE can be implemented in gearbox devices, Ethernet/Internet Protocol (IP) switch silicon or can be integrated with new 400ZR coherent DSPs. FlexE performs multiplexing at the service layer (section layer) and does not burden the 400ZR interface adaptation. IEEE 802.3ct can still define 400ZR as a new Ethernet PMD and not be burdened with multiplexing. FlexE provides section overhead for the multiplexing information.

As described herein, a 100G FlexE Instance is a unit of information including 100G of capacity able to carry FlexE Client data, together with its associated overhead. A FlexE Client is an Ethernet flow based on a Media Access Control (MAC) data rate that may or may not correspond to any Ethernet PHY rate. The FlexE Client MAC rates supported by FlexE Groups are 10, 40, and m×25 Gb/s, and MTN MAC rates support m×5 Gb/s. The FlexE Client MAC rates supported by FlexE Groups may support all, or only a subset of these FlexE Client rates, e.g., m×25 Gb/s. The FlexE Shim is the layer that maps or demaps the FlexE Clients carried over a FlexE Group. Similar to the terminology of Multilink Gearbox (MLG), the FlexE mux refers to the transmit direction which maps the FlexE Clients over the FlexE Group. The FlexE demux refers to the receive direction which demaps the FlexE Clients from the FlexE Group.

FlexE for Multiplexing in ZR/ZR+

Operators (such as data center operators) are looking for flexible subrated coherent interfaces, using ZR framing. The 400ZR IA currently does not address subrating. The market is starting to call such interfaces ZR+, i.e., modules providing advanced functionality beyond conventional 400ZR. OTN does define ways of mapping into subrated interfaces. However, operators are looking for a pure Ethernet ZR type of interfaces with standard baud rates, which require slightly less bandwidth than OTN, which is more efficient for data center interconnect and other metro applications.

Figure 3:
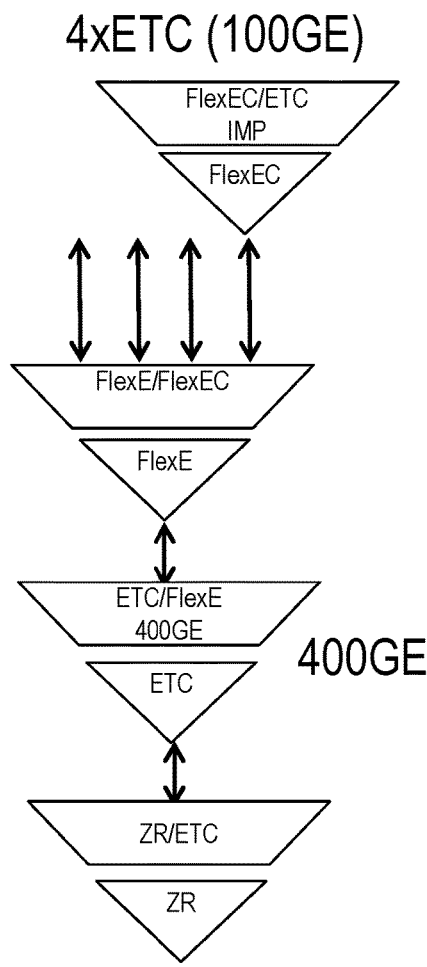
FIG. 3 is a diagram of 4× 100 GbE multiplexed into 400ZR.

FIG. 3 is a diagram of 4×100 GbE multiplexed into 400ZR. Here, four ETC (100 GbE) signals are mapped with Idle Mapping Procedure (IMP) to one 400 GbE signal that is mapped to 400ZR. FlexE can operate with any Ethernet PMD application including 400ZR or IEEE 802.3ct.

Figure 4:
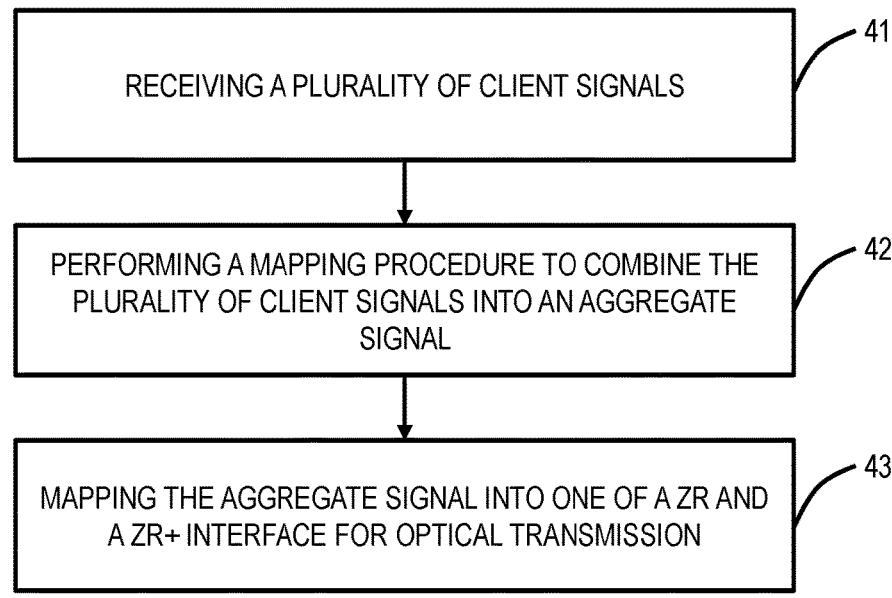
FIG. 4 is a flowchart of a process for multiplexing client signals into a ZR or ZR+ interface.

FIG. 4 is a flowchart of a process 40 for multiplexing client signals into a ZR or ZR+ interface. The process 40 contemplates operation in circuitry, such as the multiplexing circuit 22. The process 40 includes receiving a plurality of client signals (step 41), performing a mapping procedure to combine the plurality of client signals into an aggregate signal (step 42), and mapping the aggregate signal into one of a ZR and a ZR+ interface for optical transmission (step 43).

For example, the plurality of client signals can be Ethernet signals at any PMD or PHY, e.g., 10 GbE, 40 GbE, 100 GbE, etc. Also, other types of client signals are also contemplated, such as Fibre Channel, Common Public Radio Interface (CPRI), etc. The mapping can be any technique, including Idle Mapping Procedure (IMP), etc. In an embodiment, the process 40 can be used to combine 4×100 GbE into a 400ZR, 40×10 GbE into a 400ZR, etc.

Subrating

In addition to the process 40, there is a challenge to crunch, i.e., subrate, signals into non-standard Ethernet PMDs, i.e., odd, non-standard rate ZR/ZR+ interfaces. OTN does support an Optical Path Unit flexible (OPUflex) and Optical Data Unit flexible (ODUflex) layer that provides subrate provisioning, but there is no such approach in ZR or ZR+. OTN interleaves blocks is incompatible to how FlexE 2.0 has defined interleaving to standard PMDs (200GBASE-R and 400GBASE-R). ZR/ZR+ interfaces have more in common with standard Ethernet PMDs that OPUflex. That is, OTN does define FlexE aware crunching into ODUflex, but this makes the underlying signal incompatible to Ethernet PMDs.

In an embodiment, the present disclosure provides an approach similar to FlexE aware mapping, but into a ZR/ZR+ frame to enable subrating applications. As noted above, the mapping of FlexE into 400ZR is straightforward and like any other Ethernet PMD. However, the crunching or subrating application requires adaptation. The approach described herein can be used to address multiple types of flexible Ethernet interfaces to ZR/ZR+ lines. That is, the present disclosure includes "crunching" scenarios for FlexE aware mapping, where the line is at odd rates not currently covered by IEEE 802.3 standards.

Figure 5:
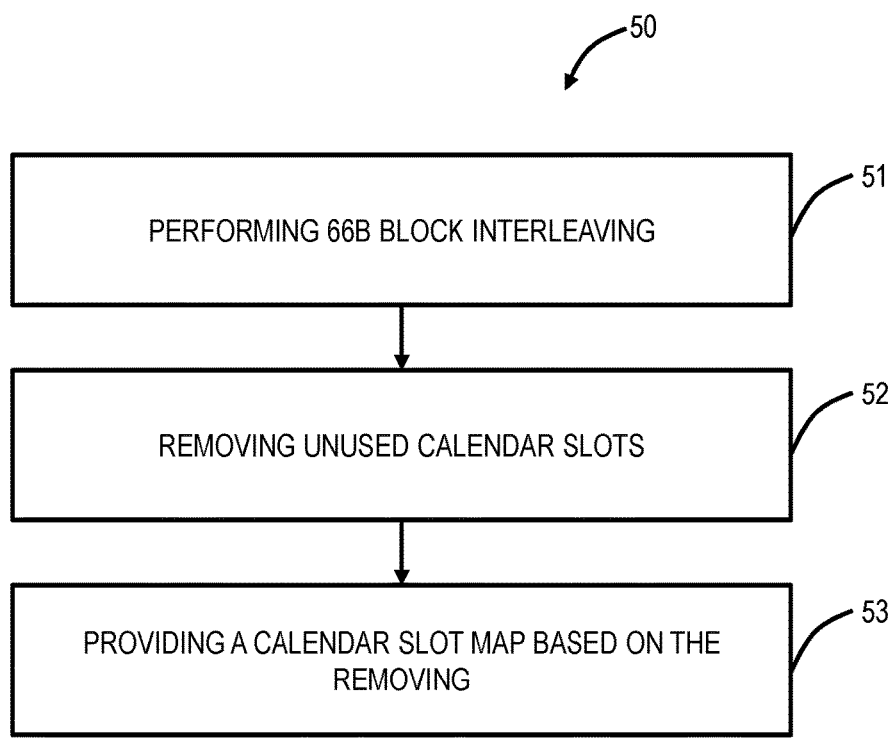
FIG. 5 is a flowchart of a process for crunching client signals to support subrate mapping.

FIG. 5 is a flowchart of a process 50 for crunching client signals to support subrate mapping. The process 50 is performed subsequent to receiving one or more client signals (e.g., Ethernet, Fibre Channel, CPRI, etc.) and mapping the one or more client signals into FlexE or MTN calendar slots. The process 50 includes performing 66b block interleaving (step 51), removing unused calendar slots (step 52), and providing a calendar slot map based on the removing (step 53).

Figure 6:
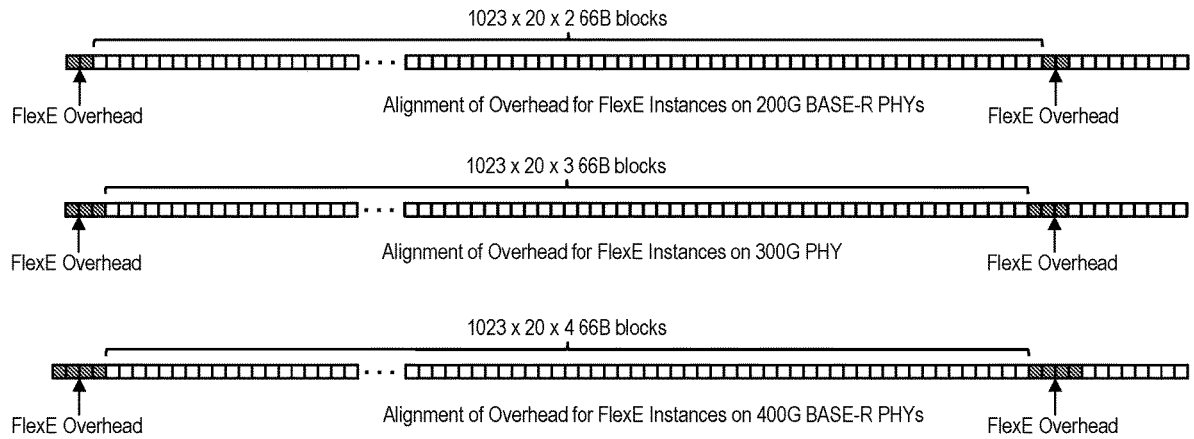
FIG. 6 is a block diagram of the alignment of overhead on interleaved 100G FlexE instances on 200GBASE-R, 300G, and 400GBASE-R PHYs.

The 66b block interleaving at step 51 is per the FlexE implementation agreement. FIG. 6 is a block diagram of the alignment of overhead on interleaved 100G FlexE instances on 200GBASE-R, 300G PHY, and 400GBASE-R PHYs. Specifically, FIG. 6 is FIG. 11 from OIF-FLEXE-02.0, with the addition of 300G PHY. Each 100GBASE-R PHY carries a single 100G FlexE Instance in the 66B block positions between alignment markers. As illustrated in FIG. 6, each 200GBASE-R PHY, 300G PHY, or 400GBASE-R PHY carries two, three, or four 100G FlexE instances and two, three, or four sets of Pads (P1, P2), respectively. Pad blocks are used to compensate the difference between the 1/16K alignment marker spacing for 100GBASE-R PHYs and the 1/20K alignment marker spacing for 200GBASE-R, PHY, or 400GBASE-R PHYs so that the 100G FlexE instances carried over all PHY types are the same nominal size. Two 66B pad blocks (P1, P2) are inserted per 163830 payload blocks at the same relative position on each 100G FlexE Instance.

The 100G FlexE instances carried by a 200GBASE-R PHY, 300G PHY, or 400GBASE-R PHY are 66B block interleaved to fill the logical 66B block space between alignment markers on each respective PHY type (note that physically, the 66B blocks are 257B transcoded on these PHYs). The block interleaving is such that all 100G FlexE instances on a PHY are fully aligned:

On a 200GBASE-R PHY, the first overhead block of the overhead multiframe for 100G FlexE Instance xxxx_xxx0 is immediately followed by the first overhead block of the overhead multiframe for 100G FlexE Instance xxxx_xxx1. This results in a sequence of two consecutive FlexE overhead blocks followed by 2×20×1023 non-pad payload blocks followed by two consecutive FlexE overhead blocks, etc.

On a 400GBASE-R PHY, the first overhead block of the overhead multiframe for 100G FlexE Instance xxxx_xx00 is immediately followed by the first overhead blocks of the overhead multiframe for 100G FlexE instances xxxx_xx01, xxxx_xx10, and xxxx_xx11 in sequence. This results in a sequence of four consecutive FlexE overhead blocks followed by 4×20×1023 non-pad payload blocks followed by four consecutive FlexE overhead blocks, etc.

The alignment of the FlexE Overhead blocks of the interleaved 100G FlexE instances on 200GBASE-R, 300G PHY, and 400GBASE-R PHYs, excluding the pad blocks is illustrated in FIG. 6.

Again, in an embodiment, the present disclosure contemplates non-standard Ethernet PMD rates and multiplexing therein. For example, non-standard Ethernet PMD rates can include 300G PHY, 700G PHY, etc. The various approaches for multiplexing 100 GbE clients directly into 200GBASE-R PHY or 400GBASE-R PHY to support multiplexing into ZR or ZR+ can be used to multiplex into a 300ZR, 700ZR, etc.

For the removing unused calendar slots at step 52, unused calendar slots are removed so that the aggregate signal is "crunched," i.e., is reduced in size. The crunching can be implemented as n×100G (with m×FlexE instances) or n×50G or n×25G or n×10G or n×5G. For example, a 300ZR+ interface could include 4×75G FlexE instances (with 60 calendar slots), a 250ZR+ interface could include 2×100G+50G FlexE instances (with calendar slots), etc.

Now, since FlexE is block interleaved, the framing is not predictable leading to a problem—how to know the calendar slot provisioning (after removal of some calendar slots) if it is not possible to find the FlexE frame, i.e., a "chicken-and-egg" problem. Accordingly, the process 50 includes a calendar slot map that provides a FlexE aware mapping procedure that can be incorporated into ZR and ZR+.

In an embodiment, the calendar slot map can be incorporated in FlexE adaptation PAD fields. The PAD fields are reused to provide a FlexE aware mapping, and this is also compatible with standard PMD techniques. With the FlexE aware mapping, the crunching complexity with indeterminism FlexE frame length is avoided.

Figure 7:
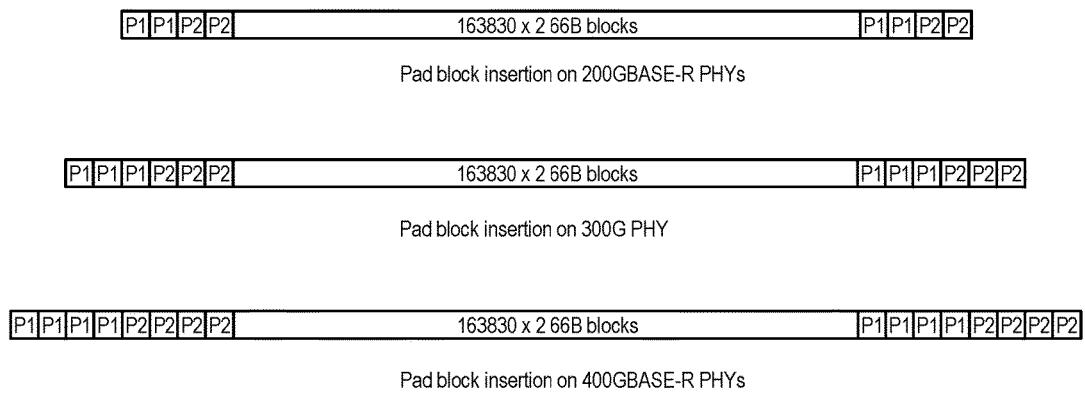
FIG. 7 is a diagram of PAD blocks P1, P2 on 200GBASE-R, 300G, and 400GBASE-R PHYs.

FIG. 7 is a diagram of PAD blocks P1, P2 on 200GBASE-R, 300G PHY, and 400GBASE-R PHYs. FIG. 7 is FIG. 12 from OIF-FLEXE-02.0, with the addition of 300G PHY. PAD blocks are inserted at the same relative position on each 100G FlexE Instance, a consequence of this alignment is that the PAD blocks will occur on 200GBASE-R PHYs in groups of four pad blocks followed by 2×163830 payload blocks followed by four pad blocks, etc., and on 400GBASE-R PHYs in groups of eight pad blocks followed by 4×163830 payload blocks followed by eight pad blocks, etc. FIG. 7 illustrates the distribution of PAD blocks on 200GBASE-R, 300G PHY, and 400GBASE-R in terms of 66B equivalent blocks between alignment markers.

FIG. 8 is a diagram the format of the P1 PAD block and a table 60 of example crunch values. This uses the same ordered set "0" code as is used to identify the FlexE overhead, with the value 0xFFFFF in bits 12-31 (where the FlexE Group number would be for the first block of the FlexE overhead frame) distinguishing this as a PAD block rather than a FlexE overhead block. Bits 8-11 of the P1 pad block are set to zero. The format of the P2 pad block is an Ethernet error control block, as shown in FIG. 23 of OIF-FLEXE-02.0.

In the table 60, the first column is "rate" such as 400ZR, 350ZR, 300ZR, 250ZR, 200ZR, 150ZR, etc. Again, these are illustrated for examples and various other rates are contemplated. The second column is an O-code value. This is an example value that is used in the PAD blocks to indicate the mapping. Again, the process 50 can use the PAD blocks to convey the calendar slot map (which can generally be referred to as the mapping). In an embodiment, the P1 PAD blocks are always with an O-code 0xFFFF as specified. In an embodiment, the P2 PAD blocks are used for providing the crunch information, i.e., the mapping, the calendar slot map. Of course, other implementations between the PAD blocks are also contemplated.

This mapping information is added on a transmit side at or before a ZR or ZR+ interface. At a receiver, i.e., a corresponding ZR or ZR+ interface, a demapper (circuitry) can frame and locate the P1 PAD blocks, independent of the FlexE frame. That is, a crunch FlexE frame is indeterministic and the P1 PAD blocks, with the O-code 0xFFFF, can be used for framing. Once the P1 PAD blocks are located, the P2 PAD blocks can be read, and the associated values can be used to locate the next P1 PAD block locations, i.e., the size of the crunched FlexE frame.

Back in the table 60, the middle column labeled "Number of P" includes the number of PAD blocks. As noted in FIG. 7, there are 2 PAD blocks for each of the P1 and P2 PAD blocks for the 200GBASE-R PHY and 4 PAD blocks for each of the P1 and P2 PAD blocks for the 400GBASE-R PHY. The column labeled "Standard PMD" indicates if these example mappings correspond to a standard PMD. For example, four 100G FlexE instances into a 400ZR corresponds to a 400GBASE-R. On the other hand, two 100G FlexE instances and two 75G FlexE instances for a 350ZR do not correspond to a standard PMD.

Finally, the last column provides a configuration of FlexE instances where 100 means a full rate FlexE Instance, 75 means a 75% full FlexE Instance, 50 means a 50% full FlexE Instance. For example, a full rate FlexE Instance has all 20 calendar slots at 5G each. A 75% full FlexE Instance has 15 of the 20 calendar slots at 5G each (5 calendar slots removed). A 50% full FlexE Instance has 10 of the 20 calendar slots at 5G each (10 calendar slots removed). Thus, as seen in the table 60, there are various techniques to multiplex lower rate signals into FlexE instances and to crunch the FlexE instances to the required rate.

The foregoing examples in the table 60 are presented for illustration purposes only. That is, other values are contemplated. That is, the examples provide n×100G, n×75G, and n×50G rates, but other values can and are contemplated including any values based on the FlexE calendar slot granularity. Further, the examples are presented up to 400ZR, but the present disclosure also contemplated higher rates such as 800ZR and the like.

GMP Mapper

In an embodiment, the present disclosure can utilize a 400 GbE to ZR Generic Mapping Protocol (GMP) engine to map FlexE to ZR. With non-standard rates, the FlexE overhead ratios are slightly off, but the GMP slack can accommodate. Some designs might choose to be synchronous and can opt to design a Bit synchronous (BGMP) engine (like OTN) with fixed DS modulator to map FlexE to ZR. The Ethernet (client signal) to FlexE adaptation is the asynchronous layer.

Example Deployments

Figure 9A:
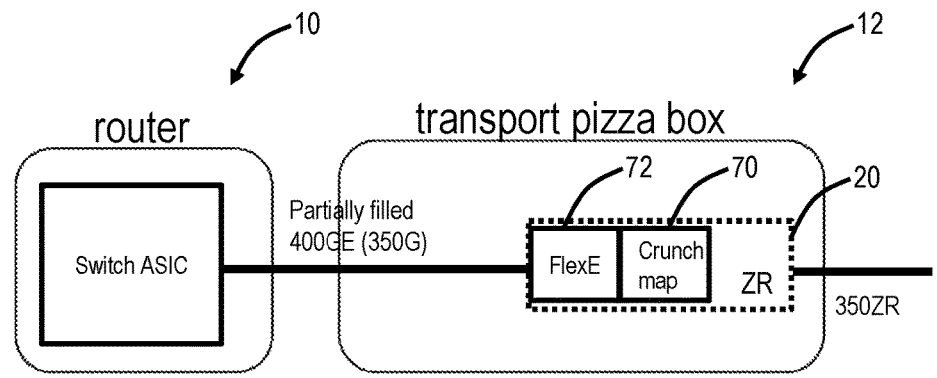
FIGS. 9A-9C are diagrams of various examples of subrating with a ZR interface in a transport device.
Figure 9B:
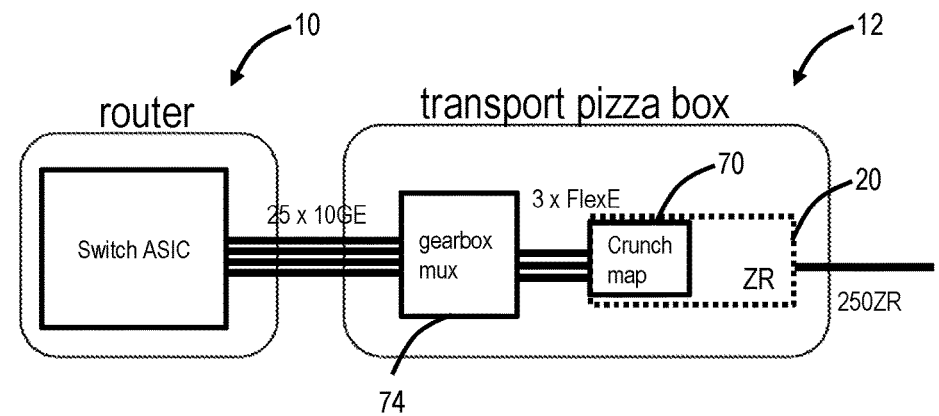
Figure 9C:
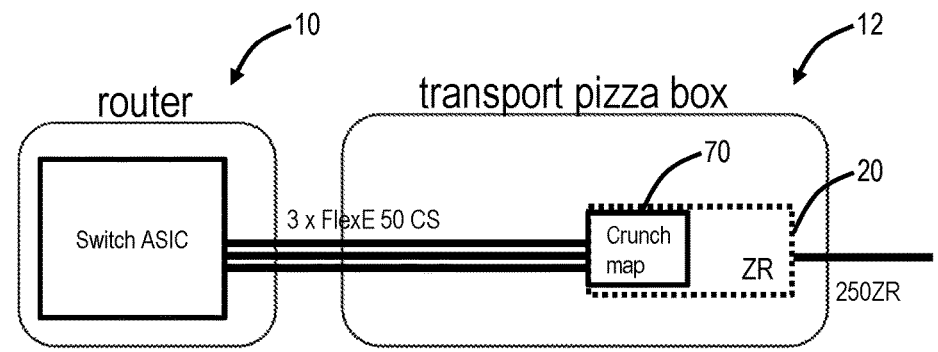

FIGS. 9A-9C are diagrams of various examples of sub-rating with a ZR interface 20 in a transport device 12. In these examples, the ZR interface 20 is located in the transport device 12. Here, the router 10 provides non-standard rates to the ZR interface 20. Of course, other embodiments are also contemplated including having the ZR interface 20 in the router 14 having integrated optics. In each of the examples, the ZR interface 20 includes a crunch map 70 that is the calendar slot mapping, the mapping, etc. as described herein. This data can be in the P2 PAD blocks or the like, and it is used to determine the size of the FlexE frame.

In FIG. 9A, the router 10 provides a partially filled 400 GbE filled to 350G to the ZR interface 20. The ZR interface 20 includes FlexE mapping circuitry 72 that receives the 350G and maps it to FlexE instances (and calendar slots), such as two 100G FlexE instances and two 75G FlexE instances. This mapping is embodied in the crunch map 70 that is included in the transmitted 350ZR from the ZR interface 20.

In FIG. 9B, the router 10 provides 25×10 GbE interfaces to a gearbox mux 74 in the transport device 12. The gearbox mux 74 provides 3 FlexE Instances (e.g., two 100G FlexE instances and one 50G FlexE instance) to the ZR interface 20. In FIG. 9C, the router 10 provides 3 FlexE Instances (e.g., two 100G FlexE instances and one 50G FlexE instance) directly to the ZR interface 20.

Process

Figure 10:
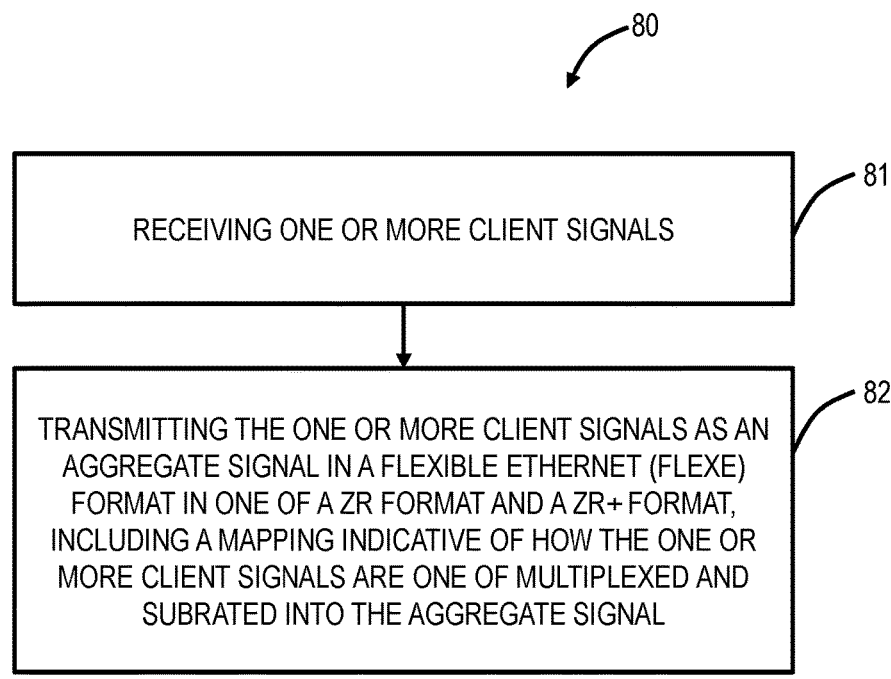
FIG. 10 is a flowchart of a process implemented by a ZR or ZR+ interface

FIG. 10 is a flowchart of a process 80 implemented by a ZR or ZR+ interface. The process 80 includes receiving one or more client signals (step 81); and transmitting the one or more client signals as an aggregate signal in a Flexible Ethernet (FlexE) format in one of a ZR format and a ZR+ format, including a mapping indicative of how the one or more client signals are multiplexed into the aggregate signal (step 82). The process 80 can be implemented via circuitry in the ZR or ZR+ interface or in a transport device that includes one or more ZR or ZR+ interfaces.

The aggregate signal can have a rate that does not correspond to a standard Ethernet Physical Medium Dependent (PMD). The FlexE format can include a plurality of FlexE instances with at least one of the FlexE instances having calendar slots removed. The mapping can be located in one or more PAD blocks associated with the FlexE format. The one or more client signals can be to the FlexE format utilizing an asynchronous mapping, and the FlexE format can be mapped to one of the ZR format and the ZR+ format utilizing a Bit synchronous Generic Mapping Protocol (BGMP). Circuitry configured to receive the one or more client signals can be connected to a router, and the router can provide the one or more client signals at rates less than the ZR format and the ZR+ format. The ZR or ZR+ interface can also include an optical interface configured to transmit the aggregate signal in one of the ZR format and the ZR+ format.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read-Only Memory), an EPROM (Erasable Programmable Read-Only Memory), an EEPROM (Electrically Erasable Programmable Read-Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A ZR or ZR+ interface comprising circuitry configured to:
   receive one or more client signals from a router,
   one or more of multiplex and crunch the one or more client signals in one of a ZR format and a ZR+ format, and
   transmit the one of the ZR format and the ZR+ format as an aggregate signal including the one or more client signals.

2. The ZR or ZR+ interface of claim 1, wherein the aggregate signal has a rate that does not correspond to a standard Ethernet Physical Medium Dependent (PMD) rate.

3. The ZR or ZR+ interface of claim 1, wherein the one or more client signals received from the router are at rates less than rates of one of the ZR format and the ZR+ format.

4. The ZR or ZR+ interface of claim 1, wherein the circuitry is further configured to
   insert a mapping indicative of how the one or more client signals are located in the aggregate signal.

5. The ZR or ZR+ interface of claim 4, wherein the mapping includes Idle Mapping Procedure (IMP).

6. The ZR or ZR+ interface of claim 4, wherein the mapping includes Generic Mapping Protocol (GMP).

7. The ZR or ZR+ interface of claim 4, wherein the mapping is into calendar slots.

8. The ZR or ZR+ interface of claim 4, wherein the mapping is located in one or more PAD blocks.

9. The ZR or ZR+ interface of claim 4, wherein the mapping includes two steps including an asynchronous mapping and a Bit synchronous Generic Mapping Protocol (BGMP).

10. The ZR or ZR+ interface of claim 1, further comprising
    an optical interface configured to transmit the aggregate signal in one of the ZR format and the ZR+ format.

11. A method comprising steps of:
    receiving one or more client signals from a router;
    one or more of multiplexing and crunching the one or more client signals in one of a ZR format and a ZR+ format; and
    transmitting the one of the ZR format and the ZR+ format as an aggregate signal including the one or more client signals.

12. The method of claim 11, wherein the aggregate signal has a rate that does not correspond to a standard Ethernet Physical Medium Dependent (PMD) rate.

13. The method of claim 11, wherein the one or more client signals received from the router are at rates less than rates of one of the ZR format and the ZR+ format.

14. The method of claim 11, wherein the steps further include
    inserting a mapping indicative of how the one or more client signals are located in the aggregate signal.

15. The method of claim 14, wherein the mapping includes Idle Mapping Procedure (IMP).

16. The method of claim 14, wherein the mapping includes Generic Mapping Protocol (GMP).

17. The method of claim 14, wherein the mapping is into calendar slots.

18. The method of claim 14, wherein the mapping is located in one or more PAD blocks.

19. The method of claim 14, wherein the mapping includes two steps including an asynchronous mapping and a Bit synchronous Generic Mapping Protocol (BGMP).

20. The method of claim 14, wherein the steps further include
    transmitting the aggregate signal in one of the ZR format and the ZR+ format via an optical interface.

* * * * *